United States Patent
Schoch

(10) Patent No.: US 6,466,840 B1
(45) Date of Patent: Oct. 15, 2002

(54) DETAILED DIE PROCESS SEVERITY ANALYSIS AND OPTIMIZATION METHODOLOGY

(75) Inventor: Daniel A. Schoch, Minster, OH (US)

(73) Assignee: The Minster Machine Company, Minster, OH (US)

( * ) Notice: Subject to any disclaimer, the term of this patent is extended or adjusted under 35 U.S.C. 154(b) by 0 days.

(21) Appl. No.: 09/431,355

(22) Filed: Nov. 1, 1999

Related U.S. Application Data

(60) Provisional application No. 60/106,899, filed on Nov. 3, 1998.

(51) Int. Cl.$^7$ .................. G01M 19/00; B30B 15/00; B30B 15/14
(52) U.S. Cl. .................. 700/206; 73/11.01; 73/579; 73/593; 100/99; 702/56
(58) Field of Search .................. 700/206; 702/56, 702/113, 189, 190; 73/593, 579, 11.01, 12.01, 649, 658, 869.9; 100/99, 48, 43

(56) References Cited

U.S. PATENT DOCUMENTS

| | | | | |
|---|---|---|---|---|
| RE30,298 E | * | 6/1980 | Keller | 702/182 X |
| 4,982,334 A | * | 1/1991 | Balakrishnan | 702/190 X |
| 5,094,107 A | * | 3/1992 | Schoch | 73/862.06 |
| 5,285,722 A | * | 2/1994 | Schockman | 100/99 X |
| 5,566,092 A | * | 10/1996 | Wong et al. | 702/185 |
| 5,673,601 A | * | 10/1997 | Ejima et al. | 100/35 X |
| 5,692,404 A | * | 12/1997 | Kirii et al. | 72/15.1 |
| 6,257,065 B1 | * | 7/2001 | Kyrtsos | 73/660 X |
| 6,260,004 B1 | * | 7/2001 | Hays et al. | 702/185 X |
| 6,270,628 B1 | * | 8/2001 | Suomi et al. | 100/99 X |

FOREIGN PATENT DOCUMENTS

| | | | | |
|---|---|---|---|---|
| JP | 54-122483 | * | 9/1979 | 100/99 |
| JP | 4-105798 | * | 4/1992 | 100/99 |

* cited by examiner

Primary Examiner—Thomas P. Noland
(74) Attorney, Agent, or Firm—Randall J. Knuth

(57) ABSTRACT

A system is provided for monitoring the operation of a press machine over a series of press running cycles. A plurality of press operating events associated with the operation of the press machine are defined. Each press operating event has a modifiable control function associated therewith. An arrangement of accelerometers measures the press machine vibrational activity associated with each press operating event that occurs during the series of press running cycles. A processor processes the vibration measurements associated with the press operating events to identify the presence of a vibration trend therein meeting a defined trending criteria. A controller is responsive to trend identification signals generated by the processor for modifying the respective control function of each press operating event which is associated with identification of the vibration trend.

30 Claims, 14 Drawing Sheets

A- 100 SPM (ORIGINAL CONDITION)

C- 450 SPM (ORIGINAL CONDITION)

F- 450 SPM (FINAL CONDITION)

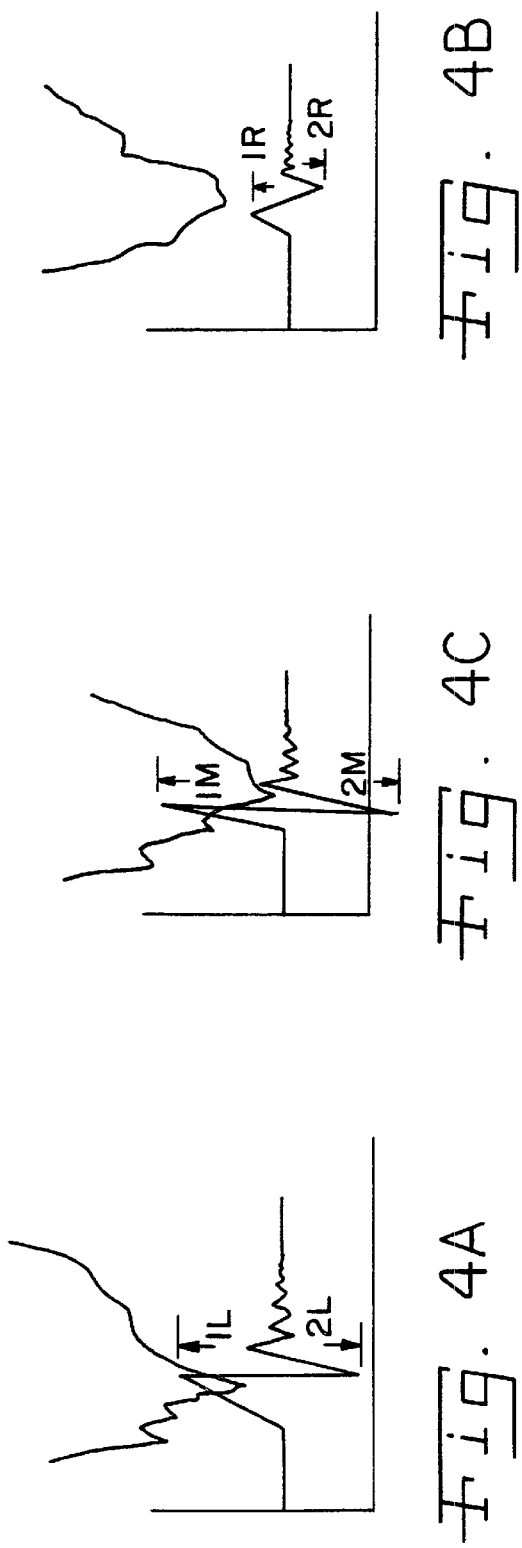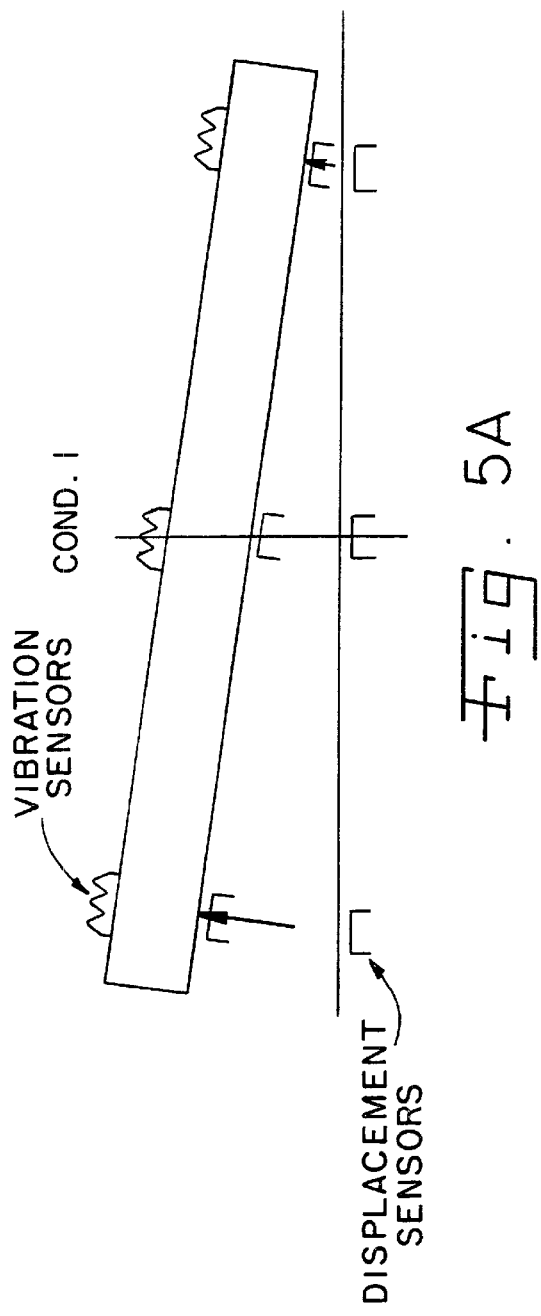

DETAILED DIE PROCESS SEVERITY ANALYSIS AND OPTIMIZATION METHODOLOGY

CROSS-REFERENCE TO RELATED APPLICATIONS

This application relates to and claims the benefit under 35 U.S.C. §119 of Provisional Application Ser. No. 60/106,899 filed Nov. 3, 1998 by the same inventor.

BACKGROUND OF THE INVENTION

1. Field of the Invention

The present invention relates generally to press vibration monitoring, and, more particular, to a method of reducing dynamic factors during press operation, thereby lowering production press vibration severity levels.

2. Description of the Related Art

It has been found through experimentation that as press speed increases there are many additional die loads that occur that are not present at slower press speeds. There are actually several additional sources of significant die loads that, in general, many press owners, manufacturers, and operators do not know exist. At higher speeds, even though not exceeding the capacity of the press, the press requires more force to make the output part, and must also contend with several additional forces, which in turn creates a different set of more severe vibration conditions.

Vibration stress magnifications, created by the multiple dynamic load increases, can cause many problems with press structures. At certain definable vibration severity levels, as described in U.S. Pat. No. 5,094,107, stress magnification levels will be present, thus creating increased maintenance problems for the press and tooling. Vibration monitoring systems of the prior art shut down the press at an individual predetermined level, which when reached would begin to cause long term reliability damage to the press.

U.S. Pat. No. 5,094,107 measures this vibration severity while in actual production, and allows the press operator and production manager to know the long term liability effects of running the press at any combination of sensed speed and load. By monitoring the actual vibration severity level of the die application, and comparing the corresponding operation vibration severity level to a previously produced vibration severity zone chart, either manually or electronically the long term press operation may be graded.

What is needed in the art is a methodology for detecting and detailing the particular die process functions that create production press vibration severity levels and tipping moment conditions during increased speed operation. By reducing such production press vibration severity levels, increased productivity, reliability and optimization of existing metal forming dies may result.

SUMMARY OF THE INVENTION

According to the present invention, the press for use with an existing metal die is used to identify the rate of escalation of vibration severity and/or tipping moment as production speed is increased. The system utilizes and creates a data set regarding a trend path of the press and tool by monitoring press speed versus vibration severity and other parameters.

The present invention, in one form thereof, identifies the details of vibration acceleration levels at different press operating speeds, thereby identifying attributing factors that add or multiply, to create an overall vibration severity level. After such data is acquired, concentration and optimization on major contributing parameters is utilized to reduce portions of the vibration severity curve.

The invention, in another form thereof, includes a method for determining die tipping conditions with a vibration severity monitoring apparatus. Conditions regarding the slide stripper plate, or bed tipping and die station activity may all be monitored, recorded, and analyzed with the present invention.

The invention, in one form thereof, is directed to a method of monitoring the operation of a press machine which is run through a plurality of press running cycles. According to the method, there is first defined a plurality of press operating events associated with the operation of the press machine. Each of these press operating events has an associated modifiable control function. For each one of the press operating events, there is provided a measure of the vibrational activity associated therewith that is present in the press machine during each one of the press running cycles. A vibration measurement signal is generated which is representative of the vibrational activity measurement. The vibration measurement signals associated with each press operating event are then processed to identify the presence of a vibration trend therein that meets a defined trending criteria. The respective control function of each press operating event that is associated with the identification of the vibration trend is then modified.

The press operating events include, but are not limited to, stripper plate impact on the downstroke of the press machine slide, punch impact on a workpiece, snap-through activity, and stripper plate impact on the upstroke of the press machine slide.

The vibrational activity measurements are preferably generated by an arrangement of accelerometers coupled to the press machine.

The predefined trending criteria, in one form thereof, involves a rate of change in the vibration measurement signals that exceeds a predetermined threshold level.

The monitoring method is preferably applied to a press machine that is run through press running cycles characterized by a variable press running speed. Alternately, the press running cycles may be characterized by a variable load developed within the press machine.

The invention, in another form thereof, is directed to a method of monitoring the operation of a press machine which is run through a plurality of press running cycles. According to the method, there is first provided a respective measure of the vibrational activity that is present in the press machine during each one of the press running cycles. There is generated a respective vibration measurement signal which is representative of the vibrational activity measurement. Next, there is defined a plurality of press operating events which are associated with the operation of the press machine, wherein each press operating event has an associated modifiable control function. The respective vibration measurement signal associated with each one of the press running cycles is then resolved into a corresponding set of component vibration signals each associated with a respective one of the press operating events. The respective set of component vibration signals associated with each one of the press running cycles is processed to identify the presence of a vibration trend therein that meets a defined trending criteria. This identification of the vibration trend is made in relation to component vibration signals that are associated with the same press operating event. The respective control function of each press operating event which corresponds to the component vibration signals associated with identification of the vibration trend is then suitably modified.

The monitoring method, in another form thereof, further involves correlating the respective vibration measurement signal associated with each one of the press running cycles to a preselected press operating parameter; and correlating the occurrence of each one of the press operating events to the preselected press operating parameter. These correlation operations facilitate the correlation of the respectively corresponding set of component vibration signals of each respective vibration measurement signal to respective ones of the plurality of press operating events. The preselected press operating parameter preferably includes a measure of the press machine slide displacement relative to bottom dead center.

The invention, in another form thereof, is directed to a system for monitoring the operation of a press machine over a plurality of press running cycles. The system includes a means for defining a plurality of press operating events associated with the operation of the press machine, wherein each respective one of the press operating events has a modifiable control function associated therewith. The system further includes a measurement means for providing, with respect to each one of the press operating events, a respective measure of the vibrational activity associated therewith that is present in the press machine during each one of the press running cycles, and for generating a respective vibration measurement signal representative thereof. A processor means processes the respective vibration measurement signals associated with each one of the press operating events to identify the presence of a vibration trend therein that meets a defined trending criteria and to generate trend identification signals representative thereof. A controller means, which is responsive to the trend identification signals generated by the processor means, modifies the respective control function of each press operating event which is associated with identification of the vibration trend.

The press operating events include stripper plate impact on the downstroke of the press machine slide, punch impact on a workpiece, snap-through activity, and stripper plate impact on the upstroke of the press machine slide.

The measurement means further includes at least one accelerometer coupled to the press machine.

The defined trending criteria involves a rate of change in the vibration measurement signals that exceeds a predetermined threshold level.

The press running speed is preferably varied over the plurality of press running cycles. Alternately, the load developed within the press machine is varied over the plurality of press running cycles.

The invention, in another form thereof, is directed to a system for monitoring the operation of a press machine over a plurality of press running cycles. A measurement means provides a respective measure of the vibrational activity that is present in the press machine during each one of the press running cycles and generates a respective vibration measurement signal representative thereof. There is also provided a means for defining a plurality of press operating events which are associated with the operation of the press machine, wherein each one of the press operating events has a modifiable control function associated therewith. A signal resolving means resolves the respective vibration measurement signal associated with each one of the press running cycles into a corresponding set of component vibration signals each associated with a respective one of the press operating events. A processor means processes the respective set of component vibration signals associated with each one of the press running cycles to identify the presence of a vibration trend therein that meets a defined trending criteria and to generate trend identification signals representative thereof. This vibration trend identification is made in relation to component vibration signals which are associated with the same press operating event. A control means, which is responsive to the trend identification signals generated by the processor means, modifies the respective control function of each press operating event which corresponds to the component vibration signals that are associated with identification of the vibration trend.

The system, in one form thereof, further includes a first correlation means for correlating the respective vibration measurement signal associated with each one of the press running cycles to a preselected press operating parameter and for generating a first correlation signal group representative thereof; and a second correlation means for correlating the occurrence of each one of the press operating events to the preselected press operating parameter and for generating a second correlation signal group representative thereof. There is also provided a third correlation means, which is responsive to the first correlation signal group generated by the first correlation means and to the second correlation signal group generated by the second correlation means, for correlating the respectively corresponding set of component vibration signals of each respective vibration measurement signal to respective ones of the press operating events.

The preselected press operating parameter includes a measure of the press machine slide displacement relative to bottom dead center.

The invention, in yet another form thereof, is directed to a method of monitoring the operation of a press machine having an operatively movable press member. According to the method, there is defined at least two load measurement locations associated with the movable press member. There is provided a measure of the load developed within the movable press member at each respective one of the at least two load measurement locations. Load measurement signals representative of the load measurements are generated. A determination is made of the tipping moment experienced by the movable press member based upon the generated load measurement signals. The determined tipping moment is then evaluated relative to a predefined tipping moment severity level.

The step of provided the load measurements involves providing a respective load sensor coupled to the movable press member at each respective one of the at least two load measurement locations. The movable press member includes at least one of a press machine slide and a press machine stripper plate.

In one form, the at least two load measurement locations include a first measurement location and a second measurement location each configured at a respective lateral side of the movable press member. In another form, the at least two load measurement locations include a first measurement location and a second measurement location each respectively configured at a forward side and a rearward side of the movable press member.

In another form, the at least two load measurement locations include a pair of measurement locations spaced equidistantly from a reference axis. Determining the tipping moment further involves computing the difference between the respective load measurement signals associated with each respective one of the pair of measurement locations and generating a difference signal representative thereof; and computing the tipping moment as a function of the generated difference signal and the displacement of either one of the pair of measurement locations relative to the reference axis.

The press machine monitoring activity preferably occurs substantially continuously over at least the duration of the press machine slide travel.

Evaluation of the tipping moment preferably involves controlling the operation of the movable press member in accordance with the evaluation results.

The invention, in still yet another form thereof, is directed to a system for monitoring the operation of a press machine having an operatively movable press member. A measurement means provides a measure of the load developed within the movable press member at each respective one of at least two load measurement locations thereof and generates load measurement signals representative thereof. A processor means, which is responsive to the load measurement signals generated by the measurement means, determines a tipping moment experienced by the movable press. An evaluation means evaluates the determined tipping moment relative to a predefined tipping moment severity level.

The processor means further includes a first means for computing the difference between the respective load measurement signals associated with each respective one of a pair of measurement locations and generating a difference signal representative thereof; and a second means for computing the tipping moment as a function of the generated difference signal and the displacement of either one of the pair of measurement locations relative to a reference axis.

The evaluation means further includes a controller to control the operation of the movable press member in accordance with the evaluation results.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIGS. 4A, 4B, and 4C are vibration versus time graphs depicting an embodiment useful for determining tipping moments;

FIG. 5A and 5B show a press element undergoing tipping forces;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

The present invention relates to an analysis methodology or process to create beneficial refinements and optimization regarding productivity and reliability for any existing metal forming die. The system enables a reduction of dynamic die factors thus reducing the production press vibration severity level.

The process of the present invention includes the step of defining the vibration severity level versus speed or the vibration severity level versus any other controlling parameter of the press such as a shutheight setting or material characteristic changes during normal operation. This is similar to that as described in U.S. Pat. No. 5,094,107.

Figure 1:
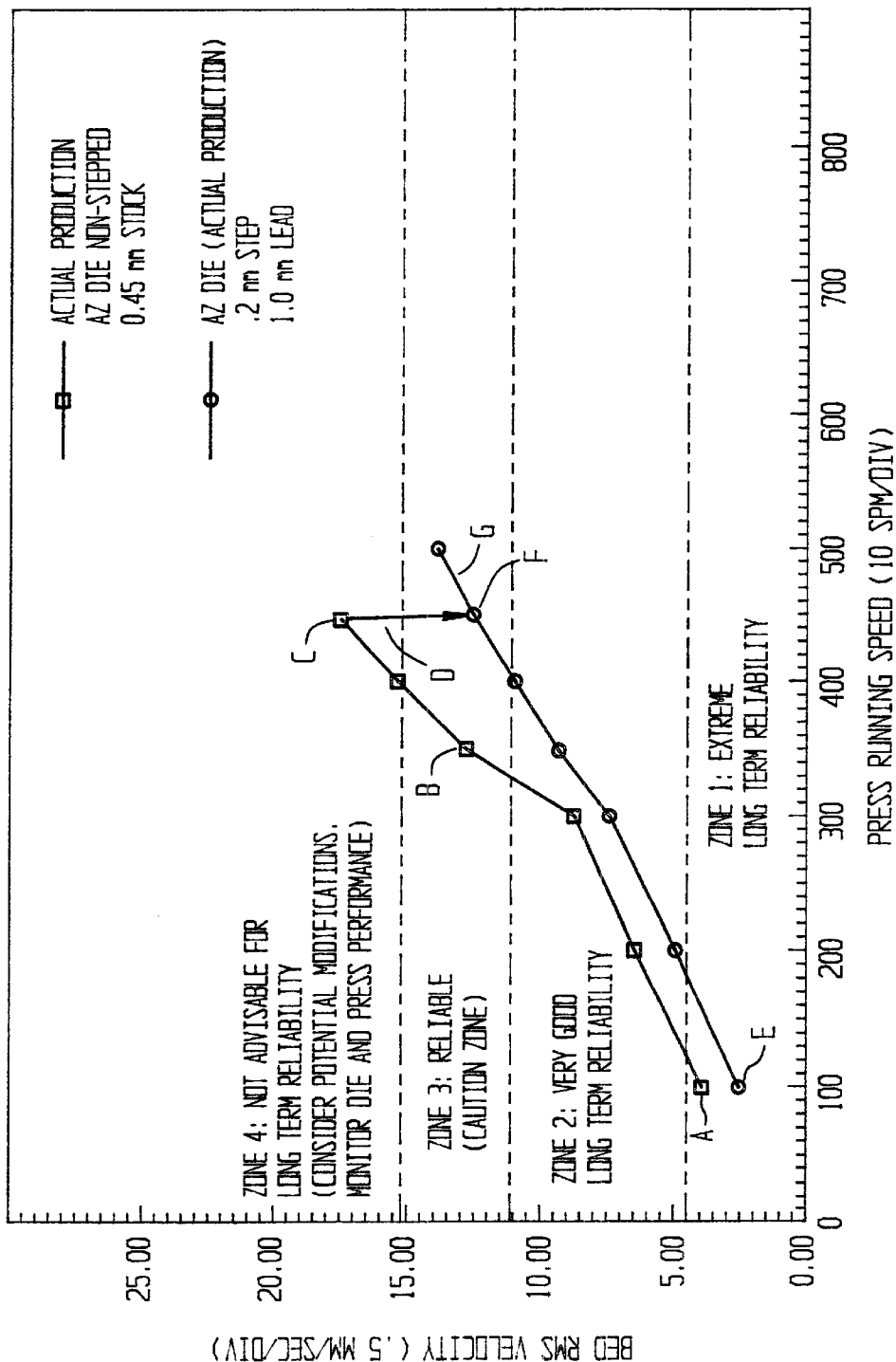
FIG. 1 shows the before and after vibration severity condition (bed RMS velocity) versus running speed graph of a press run before and after utilization of the present invention relative to a specific die.

As shown in FIG. 1, a graph of the bed RMS velocity versus press running speed is shown in which the vibration severity level is monitored on a particular press at the example 100 strokes per minute (Point A), at approximately 360 strokes per minute (Point B), and at 450 strokes (Point C). The next step of the process is to assess the corresponding levels of vibration severity at each speed versus the established vibration severity zone criteria such as that established and shown in U.S. Pat. No. 5,094,107.

The next step of the method is, by use of strategically placed accelerometers, non-contacting displacement transducers, or other monitoring devices, to define a level of acceleration activity correlated to the press slide position (or other press member) relative to the press shutheight bottom dead-center position.

A determination is made of the rate of escalation of the vibration acceleration levels associated with each of the material forming processes particularly involved with manufacturing a workpiece (e.g., blanking, bending, forming, drawing) and with each non-material forming process (e.g., tool impacts, stripper impacts) that are occurring during the press stroke production operations. A possible next step of the process is to verify with the use of die drawings, the actual intended process operations which are occurring at each specific slide position relative to press shutheight bottom dead center position.

With a verification of the actual material or non-material die processes relative to press bottom dead center position complete, coupled with the trend line of the escalating acceleration trend levels for each actual process occurring relative to the press bottom dead center position, each major contributing parameter may be addressed as needed to reduce the most significant impact in vibration effects being created during the material forming process. As shown in the example of FIG. 1, this process determines the potential use of stepping the die, or other type minor die modifications, thereby transitioning the RMS velocity versus running speed graph from, for instance at Point C to Point F.

After the recommended process reduction methods have been implemented, additional verification testing of the actual improvement levels can optionally be completed to show the increased reliable reduction speeds as produced by the die (or press) modifications at the same speed. Also after the process effects are under control, the additional speed benefits can be determined. This occurs by further increasing the speed of the press and monitoring where new RMS velocity versus running speed intercepts the maximum recommended vibration severity criteria as defined in U.S. Pat. No. 5,094,107.

Evaluation of the new die operation vibration severity trend curve relative to the established criteria for vibration severity levels (as established in U.S. Pat. No. 5,094,107) allows the production manager, manufacturer, engineer, or operator of the press to establish a new production speed with increase productivity, while retaining high reliability. Such use allows a transition from a Point B as per FIG. 1 with a set point of reliability to that of new Point G having an increased press running speed. As can be seen in FIG. 1, the before press/die application vibration severity curve (line A, B, C) as been transformed to that of new (after) press die/application trend line E, F, G.

Figure 2:
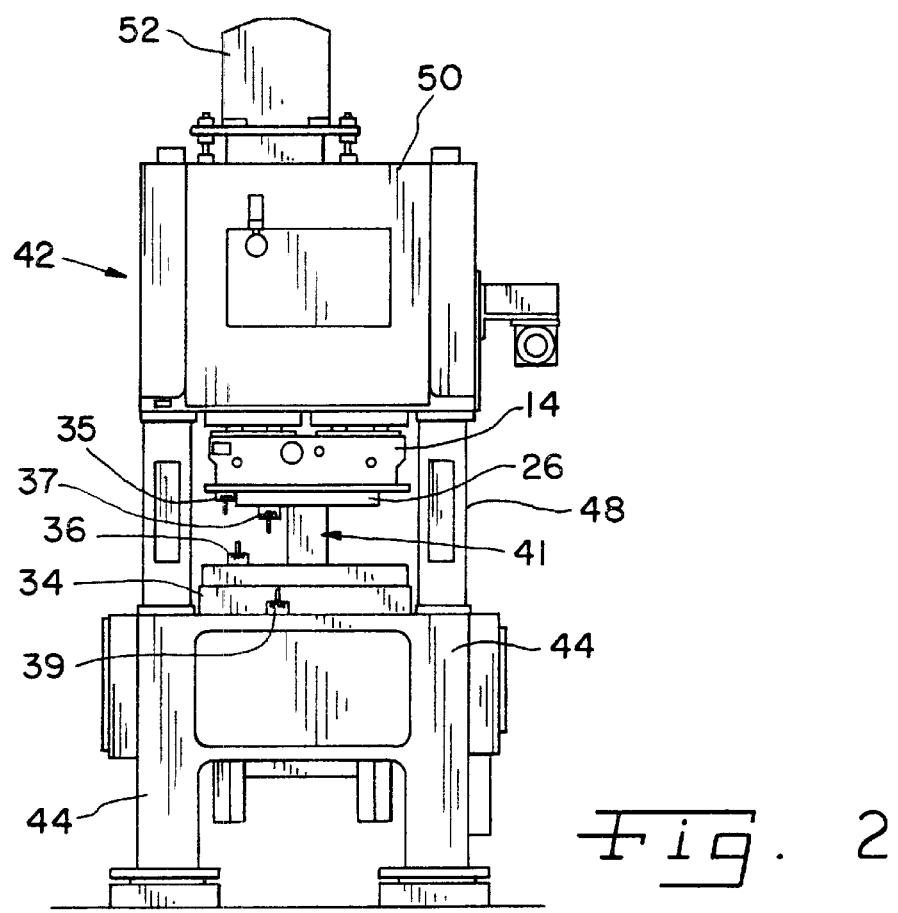
FIG. 2 is an elevational view of a typical press, which is the subject of the vibration monitoring and other parameter monitoring of the present invention in combination with monitoring elements of the present invention.

Referring to FIG. 2, there is depicted a typical press 42 having a bed 44 with bolster 34. Attached vertically to the bed 44 are uprights 48 supporting a crown 50 below which is slide 14 carrying tooling 26. Above crown 50 attached thereto is press motor 52. As shown in FIG. 2, vibration sensors 35, 36, 37 are attached to several press and die locations.

Figure 1A:
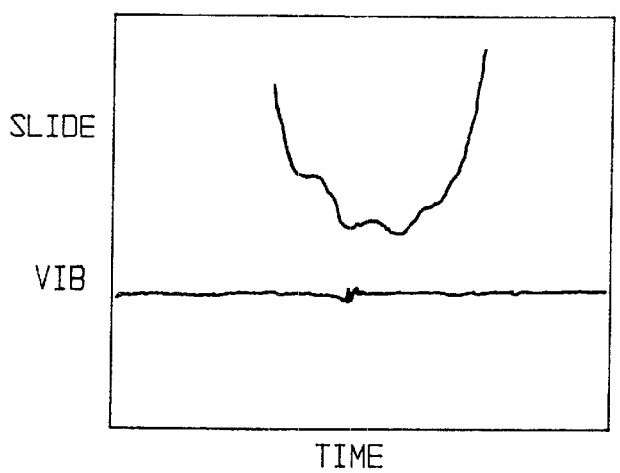
FIGS. 1A, 1B, and 1C depict an oscilloscope graph of the press slide motion and a press vibratory motion as a result of the vibration severity levels for a press operating at points A, C, and F of FIG. 1, respectively.
Figure 1B:
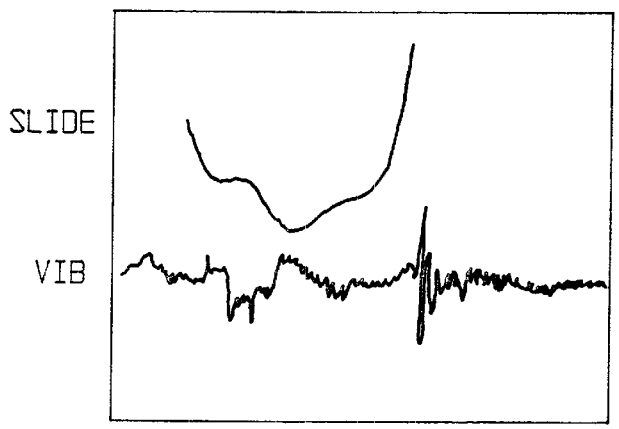
Figure 1C:
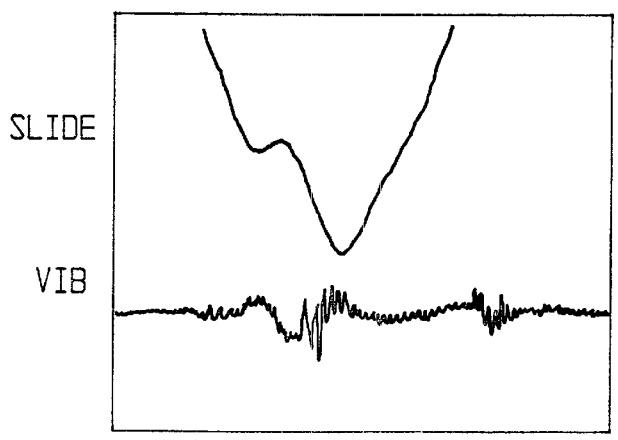

A method of the present invention is useful in identifying with any existing die, in normal production, the level of vibration severity as a production speed is increased and identifying the rate of escalation of vibration severity through, example, those of zone 1, 2, 3, and 4. As shown from FIG. 1 of a typical single or multi-stationed tooling, as press speed increases, the vibration severity level increases to approximately Point C, with that data point lying within the zone of "not advisable for long term reliability." In each case, more information is needed about the particular application before modifications can be made to the tooling to create a reduced trend path for the vibration severity of the die. FIG. 1A shows the detailed vibration acceleration as it occurs at point A at 100 strokes per minute, and in FIG. 1B that which occurs at 450 strokes per minute with the die in its original shutheight position. By identifying the details of the vibration acceleration levels at each of the different speeds, identification of how each of the contributing factors add up to create the overall vibration severity level is obtainable. By doing so, the production manager, tooling engineer, or operator can concentrate on those major contributing parameter areas, and work to reduce those specific levels. FIG. 1C, which was constructed after the modifications to the process with the invention, were complete, show that running the die at its modified state is able to create a reduced vibration severity trend curve that goes from E to F to G (FIG. 1).

Data points F and C are located at the same press running speed. In a situation as described above, by making the die modifications through the methodology defining the specific acceleration signals relative to bottom dead center position of the ram (i.e., slide) and correlated to those of the actual die drawing (by creating the Points A, B, C curve before operation of the invention and Points E, F, G curve afterwards) it is evident that the severity at 450 strokes per minute as been reduced to the lower curve. Further, by operating such as mentioned above, the ability to construct a transition of the maximum reliable running speed (Point B) on the "before" curve, which occurs at approximately 360 strokes per minute up to a Point G data point on the "after" invention utilization curve, which happens to be at approximately 475 strokes per minute is created. This particular application change represents a gain of approximately 115 strokes per minute, while such productivity gain will retain the same level of long term reliability of the press and tooling.

It should be noted that the particular magnification of the curve lines in operation of the slide versus stroke analysis is needed and includes such detail as actually identifying process parameters such as the impacts of strippers on the downstroke, impact of punches on the downstroke, material snap through, and also particular material or non-material impacts or vibrational effects occurring on the slide up stroke, are important considerations in terms of defining when such impacts occur and comparing that to the vibration levels at that time during a particular stroke position. The escalation of both material forming processes and non-material forming processes need to be identified and compared to the vibration severity curve.

The identification portion of the methodology is used to determine changes in the die and more particularly the processes relative to its BDC position. By verifying the vertical slide position of each process versus the use of the die drawings in an actual intended process operation, each specific slide position relative to the press shutheight bottom dead center position may be identified. By looking at the vibration severity signals relative to their height above bottom dead center and collating that to the die prints (i.e., identification of the intended operation happening at a certain distance above bottom dead center) one can verify or confirm that a point of high vibrations is associated with an actual material or non-material process within the tooling. Once identification correlation have been completed, reducing that specific process item's effect may be conducted. Systematic comparison of various press variable will be later discussed.

Identification of the correlation between the activity of the die design and the acceleration of the vibration measured occurs in the above manner.

The description above discusses operations with an individual vibration signal. By comparing the individual vibration signals at each specified activity point, a relative level of severity between the various process activities may be shown on a graph. If there is a very low acceleration level associated with a certain process activity position above bottom dead center, which is associated with a certain process activity that normally identifies a minor contributing factor.

Issue identification regarding the major significant contributing factors is determined because the peak acceleration of vibration versus time curve is able to be identified versus specific slide position relative to BDC. For example, FIG. 1B shows and identifies a stripper impact on the up stroke as point 4. Point 1 in FIG. 1B is that of the stripper plate impact on the downstroke of the slide, point 2 is the punch impact on the workpiece, point 3 is identified as a snap through vibration. By seeing that relative vibration accelerations are greater at point 4 than at point 1 or 2, it identifies that the major significant contributing factor is the stripper plate in this case, and action needs to be taken to address that vibration source. By capturing and measuring the peak to peak acceleration levels at each of these production speeds, a plot can be made of the increasing acceleration of the vibration, for example, of process activity point one versus point four by seeing the rate of escalation, identification and the relative severity of each process can be determined. The inventor has identified that one does not need to address all of the processes in the tooling. Only addressing the factors that are the major contributing factors necessary to determine the cause of the vibration severity level is needed. By reducing the peak to peak accelerations of the most significant discrete processes that are occurring within the tooling, a significant reduction in the overall RMS velocity level can occur.

Of interest is that by utilization of peak to peak measurement, longevity (sustainment) of the vibration, i.e., how long the vibration occurs and rings out, has been identified as contributing to the overall vibration severity level of the press and tooling system. The more area underneath such acceleration (vibration) curve creates more area underneath the velocity curve which thereby creates more RMS velocity, i.e., which is more vibration severity. By looking, not only at peak to peak acceleration, but also at the sustained multiple peaks, such as on the press stripper elements, substantial conditions which create higher levels of vibration severity may be determined.

The physical operations to the tooling to reduce vibration are identified by utilizing the above system. In the above example, the stripper plate was determined to be contacting higher than needed, so reduction of the stripper to punch lead, i.e., that is the distance between when the punch touches the material to when the stripper plate touches the material, was conducted. By reducing that distance, which lowered the contact to a lower position on bottom dead center, the relative velocity of the slide and stripper plate were lower. Since impact, force, and vibration are conditions of velocity squared, a substantial reduction in the impact vibration condition of the stripper plate occurred. In an analysis of above example, as the slide moves downward with the stripper attached, the stripper stops on the work piece material. The slide continues downward, the stripper reaches zero velocity a certain distance above bottom dead center. On the up stroke, the further the distance the slide departs from the bottom dead center position and impacts the stripper plate, the greater the impact velocity and vibration. The slide (plus stripper bolts) accelerates the stripper mass from zero velocity to whatever the instantaneous velocity of the slide is at the point of impact. By accelerating the stripper plate mass from zero to the slide velocity instantaneously causes a high vibration level.

Figure 3:
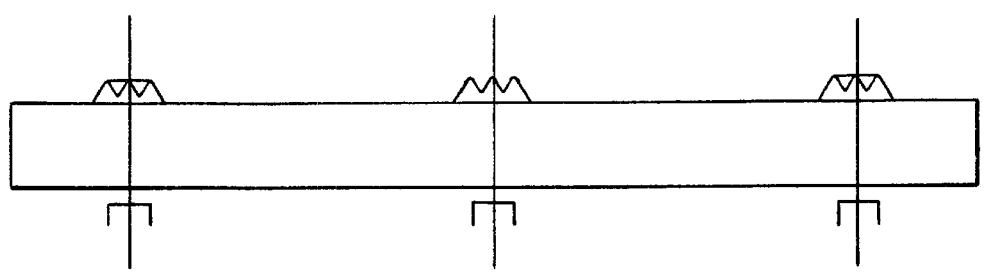
FIG. 3 depicts a member of a press to which one or several accelerometers are attached during vibration analysis.
Figure 6:
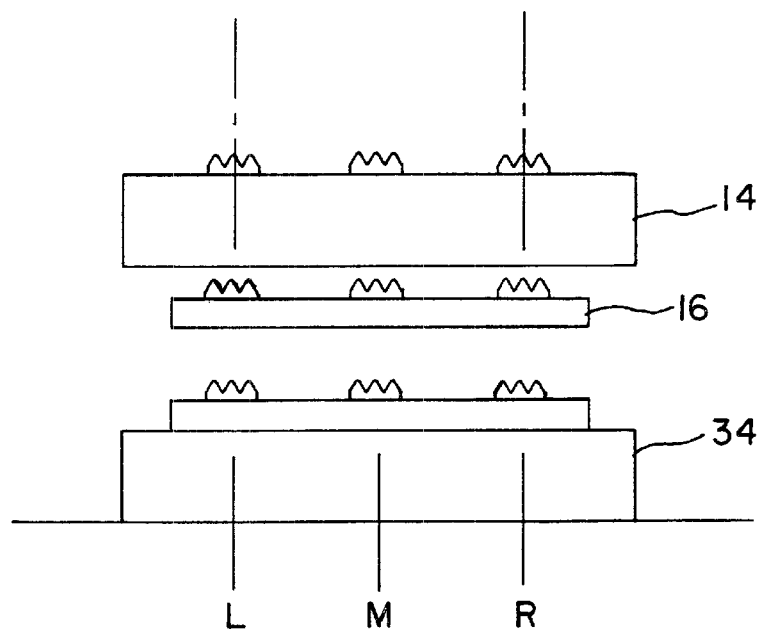
FIG. 6 is a schematic representation of another embodiment of the apparatus used to monitor a press.

In another embodiment of the present invention, vibration sensors or accelerometers, such as those labeled 35, 36, and 37 may be placed upon different press members such as shown in FIG. 3 and FIG. 6 in a number of different locations and configurations. Such members may include a lower die or bed 34 of a press, a stripper plate 16 associated with material forming production, and the upper die or slide 14 (FIG. 6). Such slide associated vibration acceleration sensors may be utilized to monitor snap-through vibrations and stripper impact vibrations.

Additionally, such accelerometers may be placed upon the die or bed 34 to monitor bending or forming load vibrations in addition to kiss blocks load vibrations and flattening station load vibrations.

By monitoring bottom dead center along with the arrival of such vibration or acceleration signals from the vibration monitors 35, 36, and 37 an adverse timing or tipping condition may be identified in the press. The use of kiss blocks between the upper and lower die at several locations can cause vibration signals at different times. By identifying the timing of such signals, identification to which kiss blocks are contacted first is possible. With such information, alteration of the tooling, loading can be utilized to control die tipping moments creating such kiss block contacts or loads. the process can also be used very effectively to identify tipping moment problem conditions during die thread or end of material conditions.

Figure 5B:
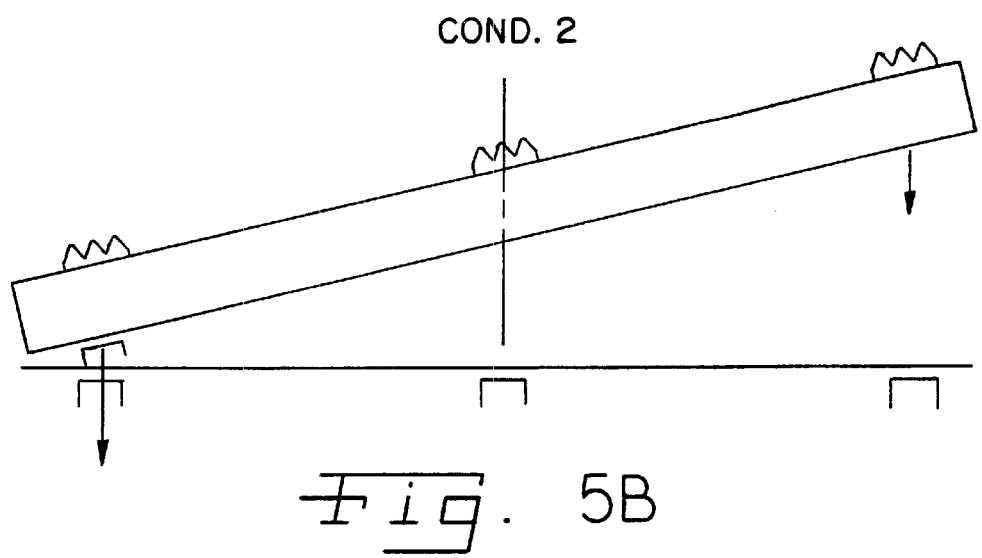

As shown in FIG. 6, the location and orientation of such vibration sensors 35–37 may be such that a controlled orientation in terms of press direction may be obtained. As shown, the vibration and/or displacement sensors are oriented such that a vertical "set" are located at the left of the press, a set is located in the middle of the press, and a set is located on the right side of the press (sets L, M, R, respectively). Alternatively, the vibration sensors or "set" of sensors may be located at specific stations as determined by the particular tooling configuration within the press. By comparing or utilizing the relative vibration signals and/or displacement signals between the various sensor subsets, an ability is created to pinpoint the main area of significant process severity vibrations, such as either L, M, or R of the press. Such subsets may also be spread out between one or more press members such as slide 14, stripper plate 16, and press bed 34 to acquire additional process severity information. Utilization of press vibration sensors 35–37 may be used to obtain further indications of any tipping conditions present at the stripper plate and/or slide. FIGS. 5A and 5B show condition one and two in which a particular press member such as a slide or stripper plate (in a highly exaggerated condition) may be found in press operation. With such geometry, the signals generated by the associated vibration and/or displacement sensors located through our the press structure in FIG. 6 would create a difference of vibration and/or displacement signals such as indicated in FIGS. 4A and 4B by determining which signal is first and/or the direction (magnitude) of such signal, i.e., as either positive or negative, and an indication may be created of the particular orientation or geometry of press member movement and vibrational response. Such timing and magnitude (positive or negative) of a vibration and/or displacement signals would be useful in identifying such undesirable press or die member conditions such as shown in FIGS. 5A and 5B.

The present process and methodology is also useful during conditions with a press including a die or tooling set, in which die materials fed or in which no die material is fed. In the case in which workpiece material is fed into the press and the vibration severity and/or acceleration effects were monitored, die material effects may be measured by the present system. In cases when the die is run with a particular die set, but with no material is fed, non-material effects found within the operating press may be identified. In another case, when the press shutheight is opened and the press is operated with the die, dynamic effects created by the press itself (i.e., without die or tooling effects) may be monitored. With such severity monitoring options, it is possible to identify the particular press or tooling variables causing an increase in vibration severity condition which creates a loss or decrease in press reliability and lifetime.

Figure 8:
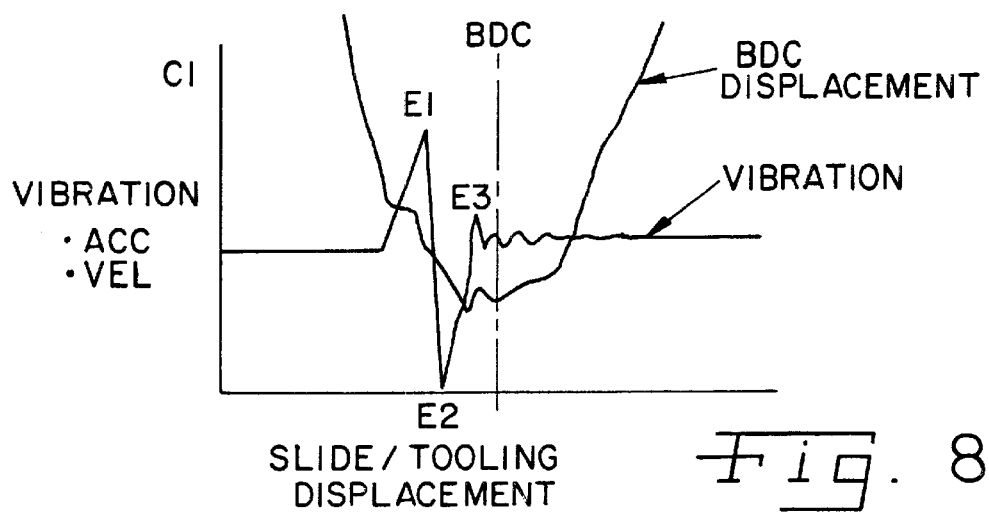
FIGS. 8 through 12 illustrate graphs of data analysis combinations as defined in Table 2.

FIGS. 8 though 12 depict example graphs used in the present method to show the key evaluation formats or displays.

Figure 7:
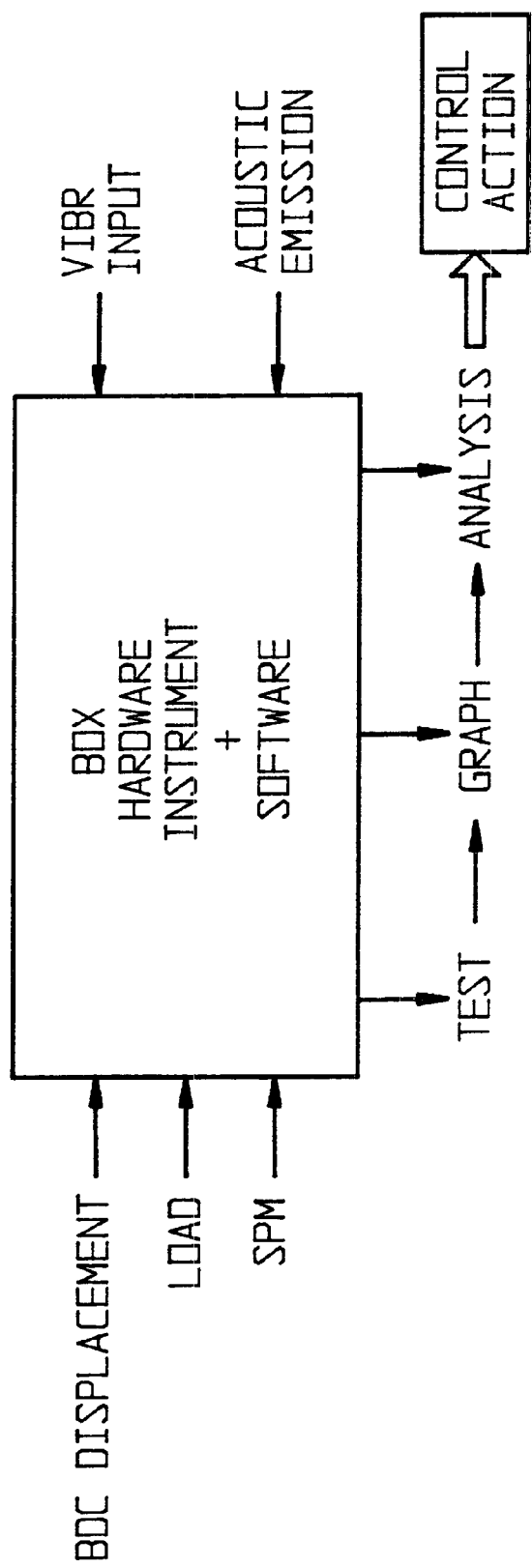
FIG. 7 is a schematic view of the apparatus of the present invention useful in conducting the inventional method.

Such graphs may be utilized and displayed in the device shown in FIG. 7 to analyze a particular press.

FIG. 7 is a schematic of an electronic device or means for collecting, displaying, and storing press data from (as shown) an accelerometer (vibration), a noncontact displacement transducer (for monitoring shutheight and press BDC displacement), load monitors, speakers (acoustic emission), and a press speed monitor reading press speed as strokes per minute (SPM). Additional means are utilized to accomplish other analysis functions as detailed in this application. Further means may be included, for example to automatically determine peak readings, total area under created curves (integration), another mathematical analysis techniques.

A programmed microprocessor including software programs accepts such data from one or more of the above sensors and contains selectable functions to test such inputs, graph such inputs and calculated values, an analyze such data as previous described. Such device may output control signals to other devices such as press controller.

Other functions the present device may include is to allow manual review and graphing of the captured data, automatic testing procedures, max-min studies, and diagnostics of the press, press sensors, and device itself.

Another form of the methodology for analysis includes determining the key evaluation parameters to view, selecting the key evaluation formats (displays), comparing analysis summaries, and comparison of the analysis formats.

Graphs 13—23 are examples of some the comparisons available for selection to assist the user in operation of the present invention. Table 1 describes the axes of the depicted graphs 13–23 along with other possible graphing and analysis formats not illustrated. Condition A recites press response before modification to tooling, press, or work piece materials. Condition B identifies press response after a modification. Series I type graphs depict analysis per stroke while series II show analysis per press stroke or per process event (i.e, a tooling event or element, press (snapthrough), other distinct material change during press operation. Series III shown analysis possible per process event. Series IV depict analysis per press stroke, while Series V again depict analysis available per process event. Particular process or Production modes available for observation and analysis include normal production operation, material threadup (initialization of press with new material into die space), material end (end of material feeding when source material or spool is gone or empty), and press inch mode or barring.

TABLE 1

\* = Preferred Display

| FIG. | VERTICAL | HORIZONTAL | COMPARISON |
|---|---|---|---|
| SERIES I (Analysis per Stroke) | | | |
| 13* | Vibration (RMS/ACC) | Slide Displacement | spm 1 vs. spm 2 (@ same cond.) |
| 14* | Load (Raw LD) | Scope Display | spm 1 vs. spm 2 (@ same cond.) |
|  | Acoustic Emission | Scope Display | spm 1 vs. spm 2 (@ same cond.) |
| 15* | Vibration (RMS/ACC) | Slide Displacement | Cond. A vs. Cond. B |
| 16* | Load (Raw LD) | Slide Displacement | Cond. A vs. Cond. B |
|  | Acoustic Emission | Slide Displacement | Cond. A vs. Cond. B |
|  | Vibration (RMS/ACC) | Slide Displacement | Material (Production) vs. No Material |
|  | Load (Raw LD) | Slide Displacement | Material vs. No Material |
|  | Acoustic Emission | Slide Displacement | Material vs. No Material |

TABLE 1-continued

\* = Preferred Display

| FIG. | VERTICAL | HORIZONTAL | COMPARISON |
|---|---|---|---|
| SERIES II (Analysis per Stroke or per Process Event) | | | |
| 17* | Vibration (P-P Acc; RMS/ACC) | spm | Condition A vs. Condition B |
|  | Load (Peak1, Peak2, P-P) | spm | Condition A vs. Condition B |
|  | Displacement (BDC PEN) | spm | Condition A vs. Condition B |
|  | Acoustic Emission | spm | Condition A vs. Condition B |
| 18* | Vibration (P-P Acc; RMS/ACC) | spm | Material vs. No Material |
|  | Load (Peak1, Peak2, P-P) | spm | Material vs. No Material |
|  | Displacement (BDC PEN) | spm | Material vs. No Material |
|  | Acoustic Emission | spm | Material vs. No Material |
| SERIES III (Analysis per Process Event) | | | |
| 19 | Vibration (P-P ACC) | Event # | spm 1 vs. spm 2 |
|  | Load (Peak1, Peak2, P-P) | Event # | spm 1 vs. spm 2 |
|  | Displacement (BDC) | Event # | spm 1 vs. spm 2 |
|  | Acoustic Emission | Event # | spm 1 vs. spm 2 |
| 21 | Vibration or Load | All Events | All Speeds (Same Condition) |
| 20* | Vibration (P-P ACC) | Event # | Cond. A vs. Cond. B (@ equal spm) |
|  | Load (Peak1, Peak2, P-P) | Event # | Cond. A vs. Cond. B \*\* |
|  | Displacement (BDC) | Event # | Cond. A vs. Cond. B \*\* |
|  | Acoustic Emission | Event # | Cond. A vs. Cond. B (@ equal spm) |
|  | Vibration (P-P ACC) | Event # | Material vs. No Material \*\* |
|  | Load (Peak1, Peak2, P-P) | Event # | Material vs. No Material \*\* |
|  | Displacement (BDC) | Event # | Material vs. No Material \*\* |
|  | Acoustic Emission | Event # | Material vs. No Material |
| SERIES IV (Analysis per Stroke) | | | |
| 22 | R-L Tipping Moment (Max) | spm | Cond. A vs. Cond. B |
| 2 | F-B Tipping Moment (Max) | spm | Cond. A vs. Cond. B |
|  | R-L Tipping Moment (Max) | spm | Material vs. No Material |
|  | F-B Tipping Moment (Max) | spm | Material vs. No Material |
|  | R-L Tipping Moment (Max) | spm | Prod. Shutheight vs. Open Shutheight |
|  | F-B Tipping Moment (Max) | spm | Prod. Shutheight vs. Open Shutheight |
| SERIES V (Analysis per Process Event) | | | |
| 23 | R-L Tipping Moment (O-P; P-P) | Slide Displacement (BDC) | Cond. A vs. Cond. B |
|  | F-B Tipping Moment | Slide Displacement (BDC) (or process event) | Cond. A vs. Cond. B |
|  | R-L Tipping Moment | Slide Displacement (BDC) | Material vs. No Material |

TABLE 1-continued

*= Preferred Display

| FIG. | VERTICAL | HORIZONTAL | COMPARISON |
|---|---|---|---|
| | F-B Tipping Moment | Slide Displacement (BDC) | Material vs. No Material |
| | R-L Tipping Moment | Slide Displacement (BDC) | Prod. Shutheight vs. Open Shutheight |
| | F-B Tipping Moment | Slide Displacement (BDC) | Prod. Shutheight vs. Open Shutheight |
| | R-L Tipping Moment | Slide Displacement (BDC) | spm 1 vs. spm 2 |
| | F-B Tipping Moment | Slide Displacement (BDC) | spm 1 vs. spm 2 |

Process (Production) Modes
Production
Material - Thread-Up
Material End
Inch Mode

TABLE 2

DETAILED DIE ANALYSIS & OPTIMIZATION KEY EVALUATION PARAMETERS

| | DATA ANALYSIS COMBINATIONS* | | | | |
|---|---|---|---|---|---|
| VIBRATION | X | | | X | X |
| BDC DISPLACEMENT | X | X | X | | X |
| LOAD | | X | | X | X |
| ACOUSTIC EMISSION | | | X | X | |
| GRAPH | 8 | 9 | 11 | 12 | 10 |

*OR ANY OTHER COMBINATION OF CROSS ANALYSIS OF THESE KEY PARAMETERS

TABLE 3

DETAILED DIE ANALYSIS AND OPTIMIZATIONS

Methodology

Figure 9:
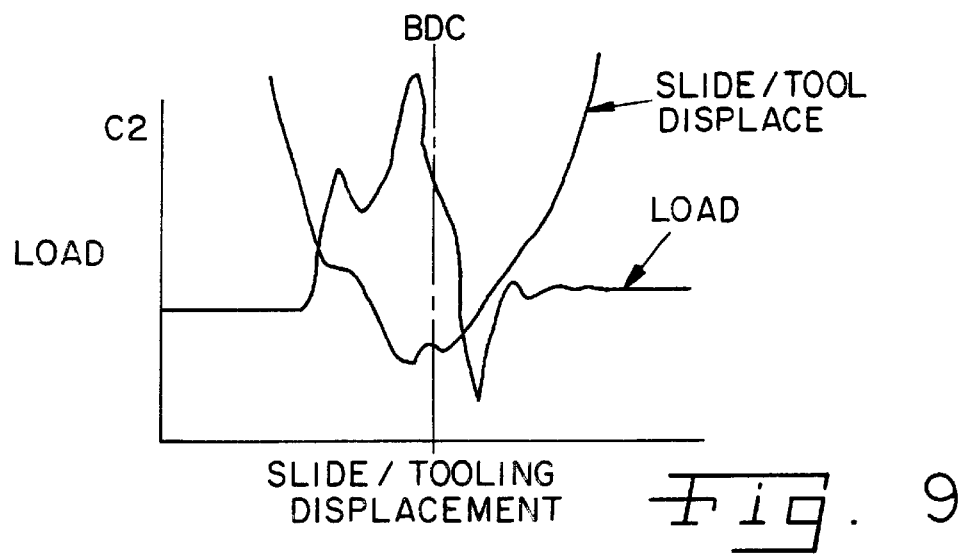
Figure 10:
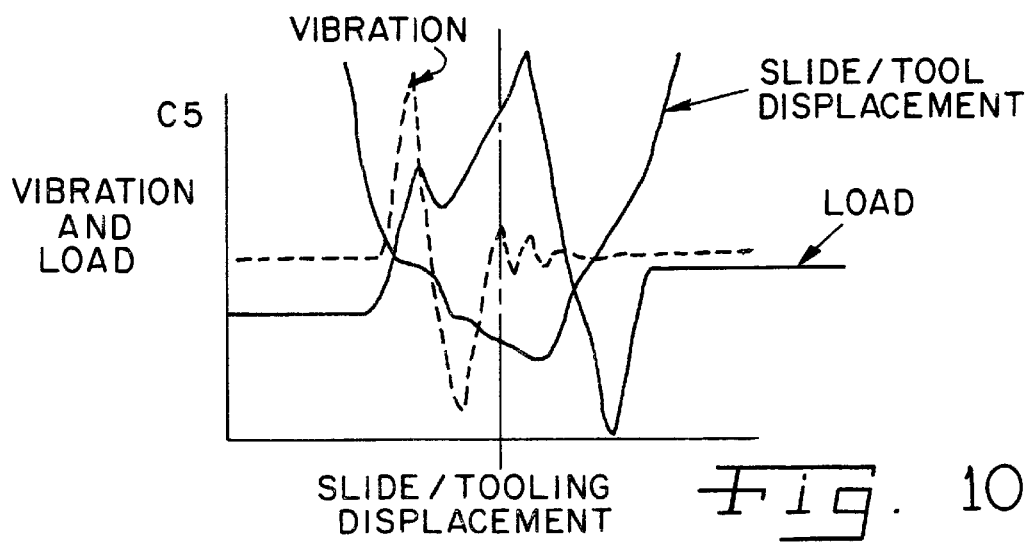
Figure 11:
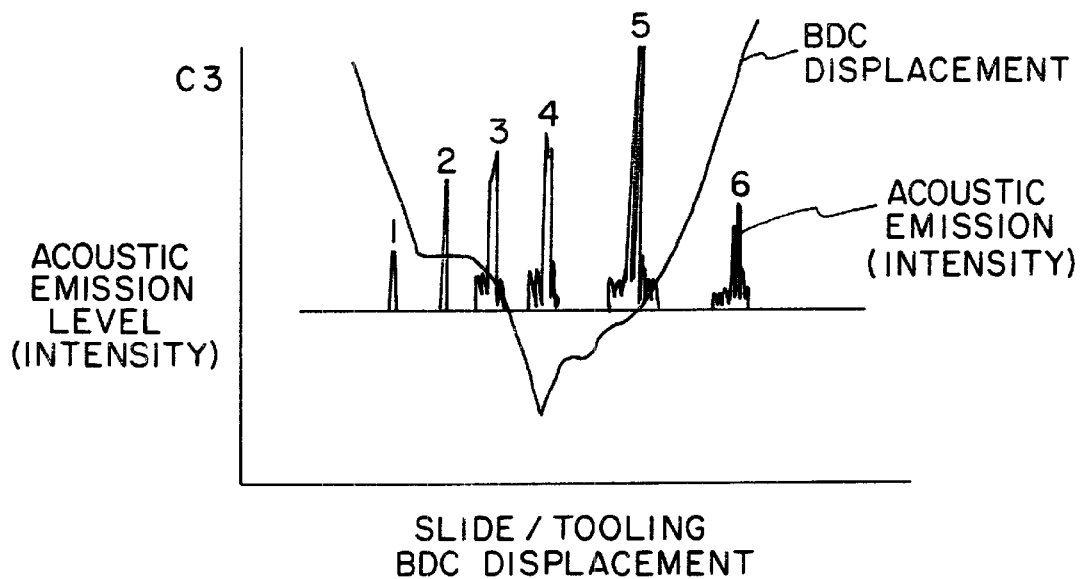
Figure 12:
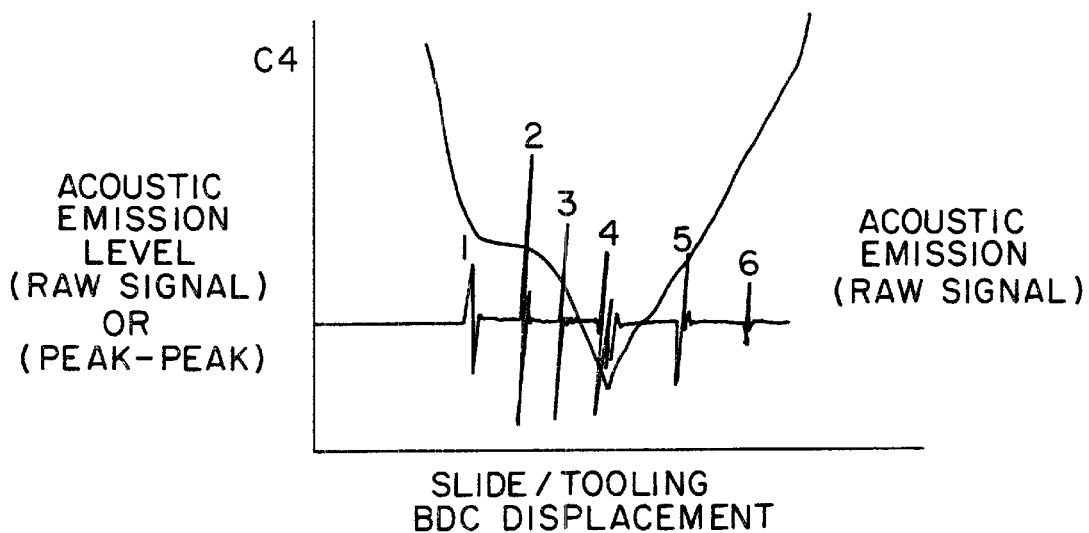
Figure 13:
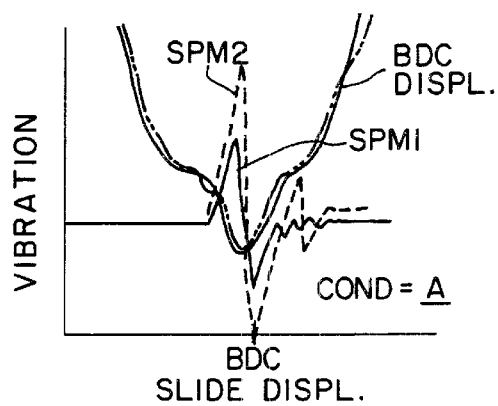
FIGS. 13–23 depict various data comparisons available through the present invention.
Figure 14:
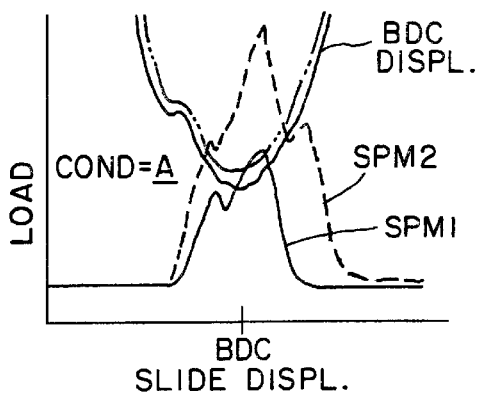
Figure 15:
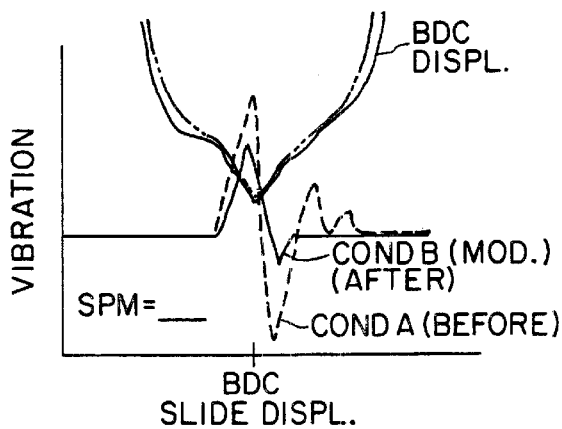
Figure 16:
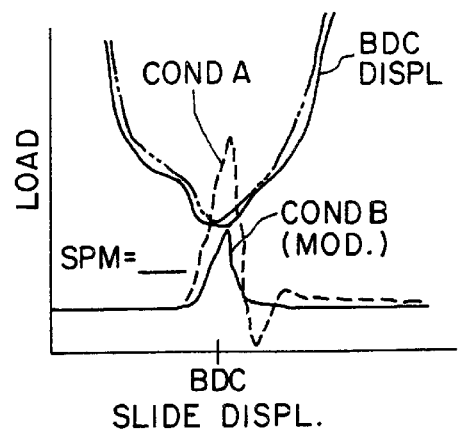
Figure 17:
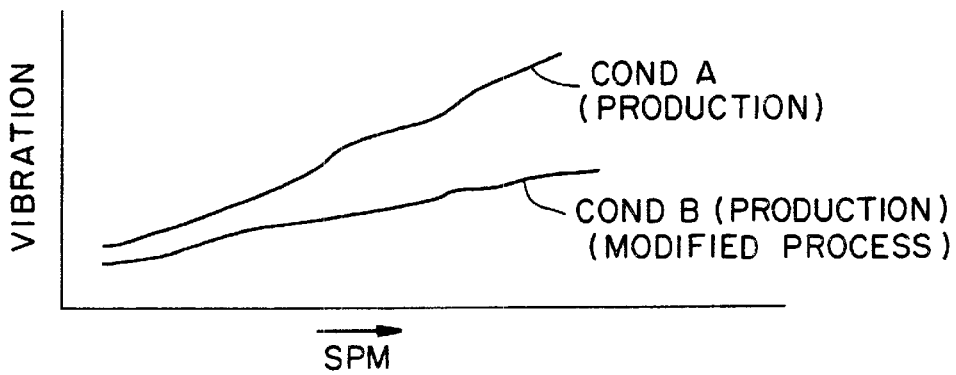
Figure 18:
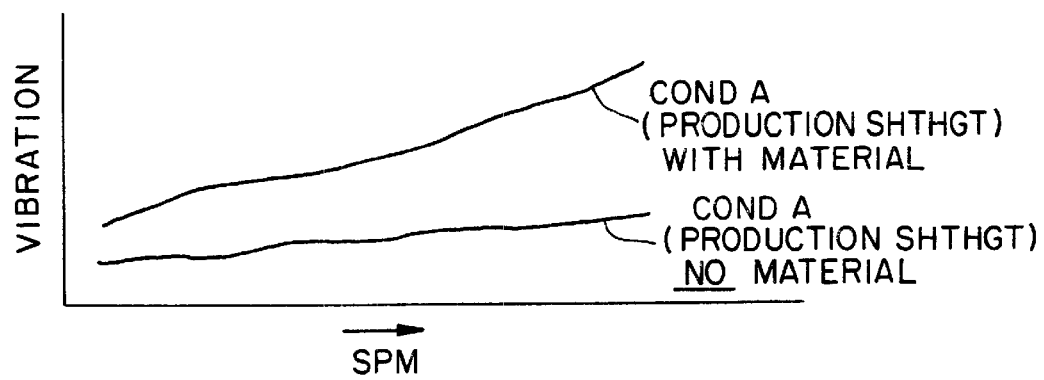
Figure 19:
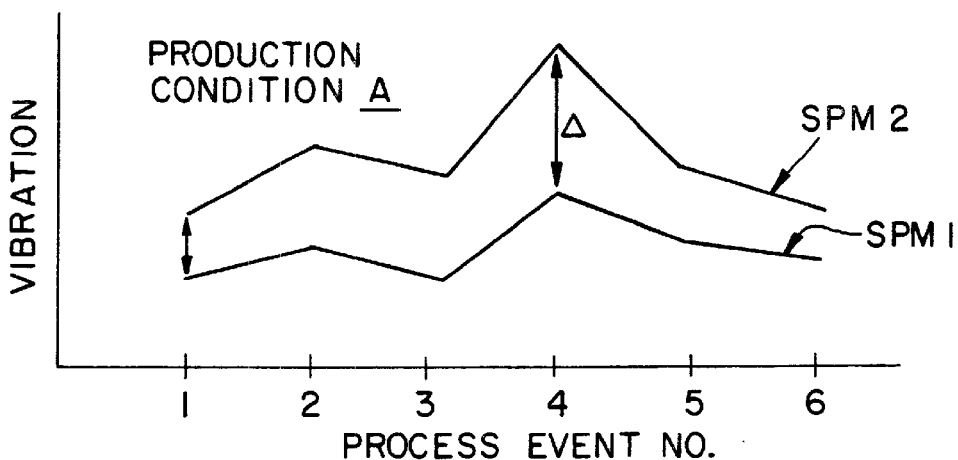
Figure 20:
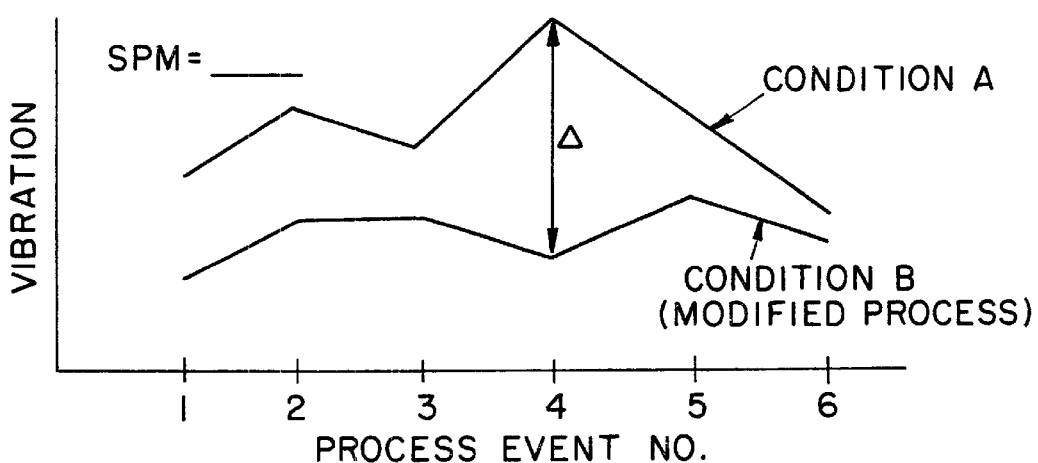
Figure 21:
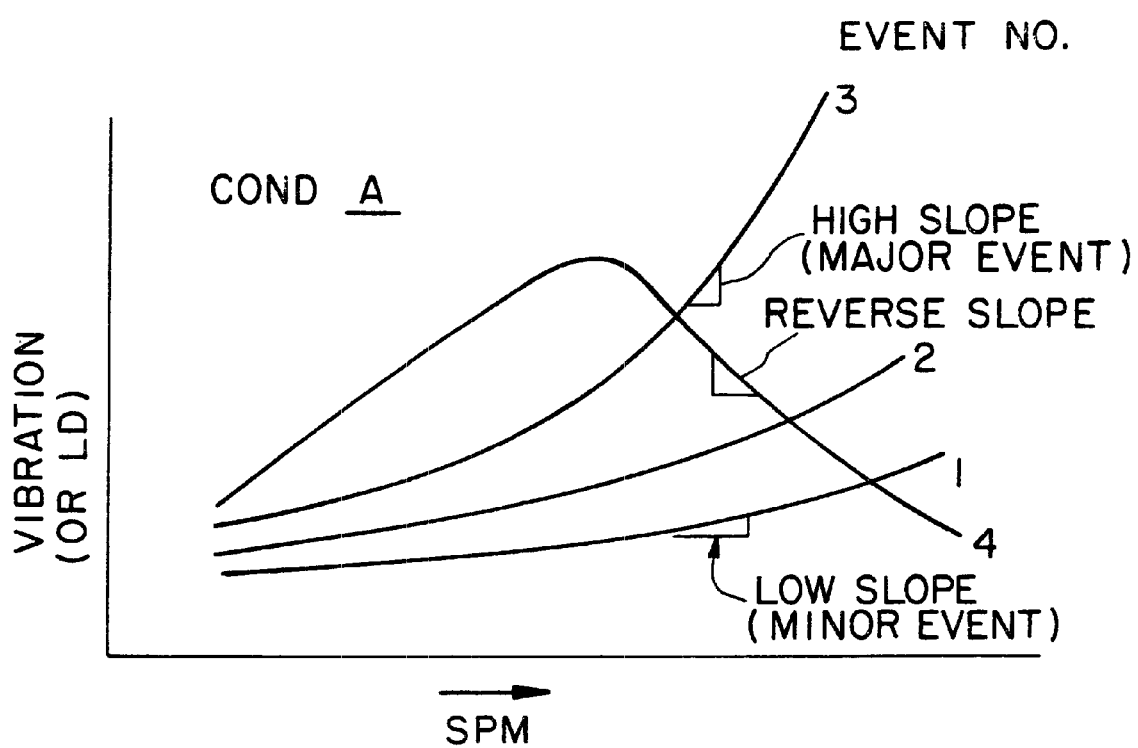
Figure 22:
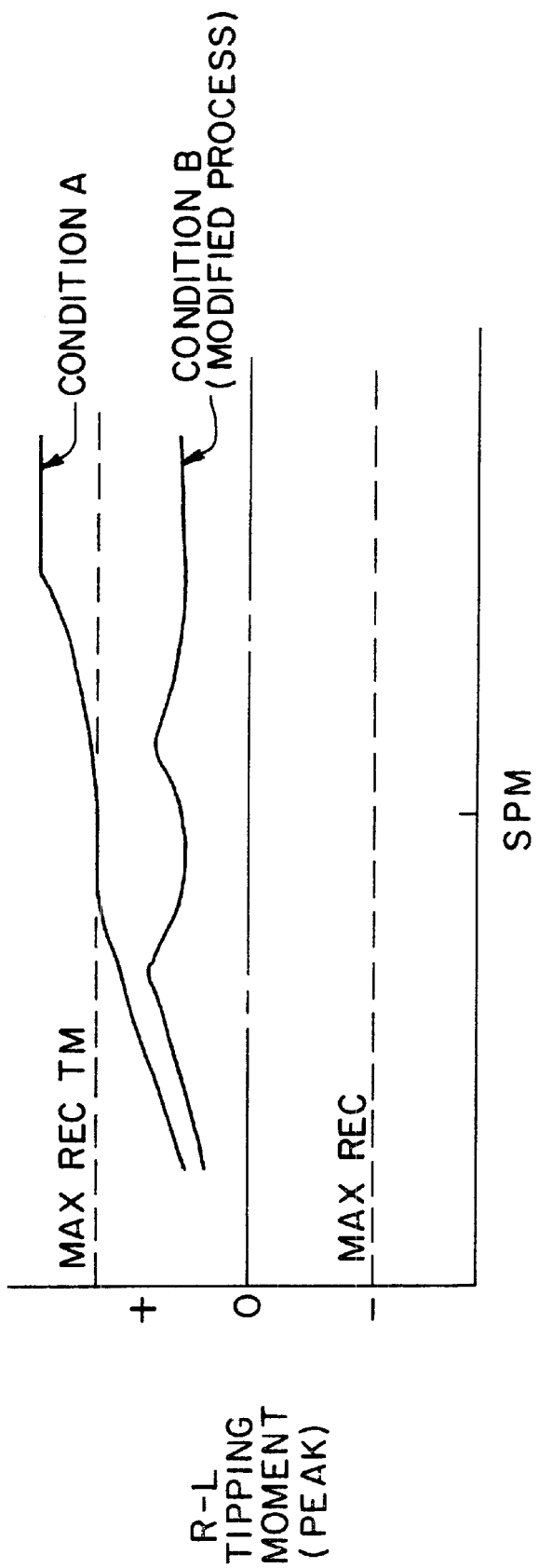
Figure 23:
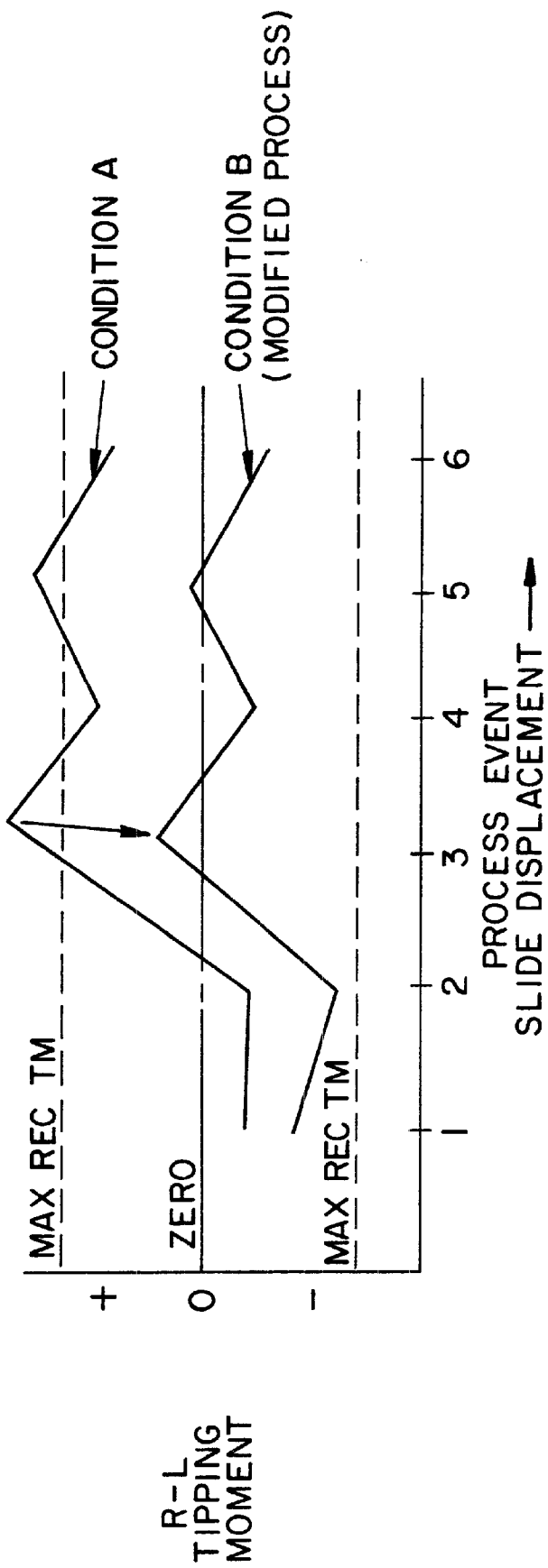

| | |
|---|---|
| Key Evaluation Parameters | Table 2 |
| Key Evaluation Formats (Displays) | FIGS. 8, 9, 10 |
| Comparison Analysis Summaries (Series I Thru Series V) | Table 1 |
| Comparison Analysis Formats (Series I Thru Series V) | Table 1 |

Apparatus

| System | Test | Graph | Analysis | Control Action* |
|---|---|---|---|---|
| Manual Control | Manual | Manual | Manual | Manual |
| Auto Test | Auto | Manual | Manual | Manual |
| Auto Display | Auto | Auto | Manual | Manual |
| Auto Diagnostics | Auto | Auto | Auto | Manual |
| Automatic Control | Auto | Auto | Auto | Auto |

*or any other combinations of manual/auto function dependent upon additional hardware development and software development While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of monitoring the operation of a press machine, comprising the steps of:
   running the press machine through a plurality of press running cycles;
   defining a plurality of press operating events associated with the operation of said press machine, each respective one of said plurality of press operating events having a modifiable control function associated therewith;
   providing for each respective one of said plurality of press operating events a respective measure of the vibrational activity associated therewith present in the press machine during each respective one of said plurality of press running cycles and generating a respective vibration measurement signal representative thereof;
   processing the respective vibration measurement signals associated with each respective one of said plurality of press operating events to identify the presence of a vibration trend therein meeting a defined trending criteria; and
   modifying the respective control function of each press operating event determined by said processing step to be associated with the identification of said vibration trend.

2. The method as recited in claim 1, wherein said plurality of press operating events includes stripper plate impact on the downstroke of the press machine slide, punch impact on a workpiece, snap-through activity, and stripper plate impact on the upstroke of the press machine slide.

3. The method as recited in claim 1, wherein said step of providing vibrational activity measurements further includes the step of:
   providing at least one accelerometer coupled to said press machine.

4. The method as recited in claim 1, wherein said defined trending criteria involves a rate of change in the vibration measurement signals exceeding a predetermined threshold level.

5. The method as recited in claim 1, wherein the step of running the press machine through a plurality of press running cycles further includes the step of varying the press running speed.

6. The method as recited in claim 1, wherein the step of running the press machine through a plurality of press running cycles further includes the step of varying the load developed within said press machine.

7. A method of monitoring the operation of a press machine, comprising the steps of:
   running the press machine through a plurality of press running cycles;
   providing a respective measure of the vibrational activity present in said press machine during each respective one of said plurality of press running cycles and generating a respective vibration measurement signal representative thereof;
   defining a plurality of press operating events associated with the operation of said press machine, each respective one of said plurality of press operating events having a modifiable control function associated therewith;
   resolving the respective vibration measurement signal associated with each respective one of said plurality of press running cycles into a corresponding set of component vibration signals each associated with a respective one of said plurality of press operating events;

processing the respective set of component vibration signals associated with each respective one of said plurality of press running cycles to identify the presence of a vibration trend therein meeting a defined trending criteria, the identification of said vibration trend being made in relation to component vibration signals associated with the same press operating event; and modifying the respective control function of each press operating event which corresponds to the component vibration signals associated with identification of said vibration trend.

8. The method as recited in claim 7, further includes the steps of:

correlating the respective vibration measurement signal associated with each respective one of said plurality of press running cycles to a preselected press operating parameter; and correlating the occurrence of each respective one of said plurality of press operating events to said preselected press operating parameter.

9. The method as recited in claim 8, further includes the step of:

correlating the respectively corresponding set of component vibration signals of each respective vibration measurement signal to respective ones of said plurality of press operating events based upon the vibration measurement signal correlation involving said preselected press operating parameter and the press operating event correlation involving said preselected press operating parameter.

10. The method as recited in claim 9, wherein said preselected press operating parameter includes a measure of the press machine slide displacement relative to bottom dead center.

11. The method as recited in claim 7, wherein said plurality of press operating events includes stripper plate impact on the downstroke of the press machine slide, punch impact on a workpiece, snap-through activity, and stripper plate impact on the upstroke of the press machine slide.

12. The method as recited in claim 7, wherein said step of providing vibrational activity measurements further includes the step of:

providing at least one accelerometer coupled to said press machine.

13. The method as recited in claim 7, wherein said defined trending criteria involves a rate of change in the component vibration signals exceeding a predetermined threshold level.

14. The method as recited in claim 7, wherein the step of running the press machine through a plurality of press running cycles further includes the step of varying the press running speed.

15. The method as recited in claim 7, wherein the step of running the press machine through a plurality of press running cycles further includes the step of varying the load developed within said press machine.

16. A system for monitoring the operation of a press machine over a plurality of press running cycles, comprising:

means for defining a plurality of press operating events associated with the operation of said press machine, each respective one of said plurality of press operating events having a modifiable control function associated therewith;

measurement means for providing, with respect to each one of said plurality of press operating events, a respective measure of the vibrational activity associated therewith present in the press machine during each one of said plurality of press running cycles and for generating a respective vibration measurement signal representative thereof;

processor means for processing the respective vibration measurement signals associated with each respective one of said plurality of press operating events to identify the presence of a vibration trend therein meeting a defined trending criteria and to generate trend identification signals representative thereof; and controller means, responsive to the trend identification signals generated by said processor means, for modifying the respective control function of each press operating event associated with identification of said vibration trend.

17. The system as recited in claim 16, wherein said plurality of press operating events includes stripper plate impact on the downstroke of the press machine slide, punch impact on a workpiece, snap-through activity, and stripper plate impact on the upstroke of the press machine slide.

18. The system as recited in claim 16, wherein said measurement means further includes at least one accelerometer coupled to said press machine.

19. The system as recited in claim 16, wherein said defined trending criteria involves a rate of change in the vibration measurement signals exceeding a predetermined threshold level.

20. The system as recited in claim 16, wherein the press running speed is varied over said plurality of press running cycles.

21. The system as recited in claim 16, wherein the load developed within said press machine is varied over said plurality of press running cycles.

22. A system for monitoring the operation of a press machine over a plurality of press running cycles, comprising:

measurement means for providing a respective measure of the vibrational activity present in said press machine during each respective one of said plurality of press running cycles and for generating a respective vibration measurement signal representative thereof;

means for defining a plurality of press operating events associated with the operation of said press machine, each respective one of said plurality of press operating events having a modifiable control function associated therewith;

signal resolving means for resolving the respective vibration measurement signal associated with each respective one of said plurality of press running cycles into a corresponding set of component vibration signals each associated with a respective one of said plurality of press operating events;

processor means for processing the respective set of component vibration signals associated with each respective one of said plurality of press running cycles to identify the presence of a vibration trend therein meeting a defined trending criteria and to generate trend identification signals representative thereof, wherein the identification being made in relation to component vibration signals associated with the same press operating event; and control means, responsive to the trend identification signals generated by said processor means, for modifying the respective control function of each press operating event which corresponds to the component vibration signals associated with identification of said vibration trend.

23. The system as recited in claim 22, further comprises:
a first correlation means for correlating the respective vibration measurement signal associated with each respective one of said plurality of press running cycles to a preselected press operating parameter and for generating a first correlation signal group representative thereof; and
a second correlation means for correlating the occurrence of each respective one of said plurality of press operating events to said preselected press operating parameter and for generating a second correlation signal group representative thereof.

24. The system as recited in claim 23, further comprises:
a third correlation means, responsive to the first correlation signal group generated by said first correlation means and to the second correlation signal group generated by said second correlation means, for correlating the respectively corresponding set of component vibration signals of each respective vibration measurement signal to respective ones of said plurality of press operating events.

25. The system as recited in claim 24, wherein said preselected press operating parameter includes a measure of the press machine slide displacement relative to bottom dead center.

26. The system as recited in claim 22, wherein said plurality of press operating events includes stripper plate impact on the downstroke of the press machine slide, punch impact on a workpiece, snap-through activity, and stripper plate impact on the upstroke of the press machine slide.

27. The system as recited in claim 22, wherein said measurement means further comprises:
at least one accelerometer coupled to said press machine.

28. The system as recited in claim 22, wherein said defined trending criteria involves a rate of change in the component vibration signals exceeding a predetermined threshold level.

29. The system as recited in claim 22, wherein the press running speed is varied over said plurality of press running cycles.

30. The system as recited in claim 22, wherein the load developed within said press machine is varied over said plurality of press running cycles.

* * * * *